(12) United States Patent
Park et al.

(10) Patent No.: US 8,717,513 B2
(45) Date of Patent: May 6, 2014

(54) DISPLAY APPARATUS

(75) Inventors: JaeWoo Park, Gumi-si (KR); SeungJae Baek, Seoul (KR)

(73) Assignee: LG Display Co., Ltd., Seoul (KR)

( * ) Notice: Subject to any disclaimer, the term of this patent is extended or adjusted under 35 U.S.C. 154(b) by 177 days.

(21) Appl. No.: 13/329,471

(22) Filed: Dec. 19, 2011

(65) Prior Publication Data
US 2012/0327325 A1  Dec. 27, 2012

(30) Foreign Application Priority Data

Jun. 24, 2011 (KR) .................. 10-2011-0061711

(51) Int. Cl.
*G02F 1/1343* (2006.01)
(52) U.S. Cl.
USPC ........................ 349/58; 349/110; 349/153
(58) Field of Classification Search
CPC ............ G02F 1/133615; G02F 1/1335; G02F 1/133524; G02F 1/133528; G02F 1/1339; G02F 1/133553; G02F 1/133603; G02F 1/153; G02F 2001/133317; G02F 2202/28
USPC ............... 349/58, 65, 110, 153, 155, 156, 96, 349/190, 113, 158; 362/632, 633, 634, 362/97.1, 97.2, 19, 382, 612, 615; 445/25; 345/87; 438/30; 257/98
See application file for complete search history.

(56) References Cited

U.S. PATENT DOCUMENTS

2010/0315570 A1\* 12/2010 Mathew et al. .................. 349/58
2011/0261283 A1\* 10/2011 Kim et al. ........................ 349/58

\* cited by examiner

*Primary Examiner* — Thoi Duong
(74) *Attorney, Agent, or Firm* — Morgan, Lewis & Bockius LLP

(57) ABSTRACT

Disclosed is a display device which can maintain a space between a lower substrate and a portion of an upper substrate with a transmitting hole formed therein, in an atmospheric pressure state. The display device includes a display unit and a guide frame. The display unit includes a panel which is sealed, with liquid crystal being charged between an upper substrate and a lower substrate. The guide frame supports the display unit. The guide frame includes a guide side wall guiding a side surface of the panel, and a panel supporting part supporting the panel.

12 Claims, 5 Drawing Sheets

DISPLAY APPARATUS

CROSS-REFERENCE TO RELATED APPLICATIONS

This application claims the benefit of the Korean Patent Application No. 10-2011-0061711 filed on Jun. 24, 2011, which is hereby incorporated by reference as if fully set forth herein.

BACKGROUND

1. Field of the Invention

The present invention relates to a display device, and more particularly, to a borderless type display device with a built-in camera.

2. Discussion of the Related Art

Recently, flat panel display devices that can decrease a weight and a volume corresponding to the limitations of Cathode Ray Tubes (CRTs) are being developed. Liquid Crystal Display (LCD) devices, Plasma Display Panels (PDPs), Field Emission Display (FED) devices, and light emitting display devices are actively being researched as flat type display devices. However, among such flat panel display devices, LCD devices are easily manufactured, have good drivability of drivers, realize a high-quality image, and thus are attracting much attention.

In terms of technology and design interesting to consumers, recently, research and development of flat panel display devices are increasingly required. Therefore, efforts are being continuously made for minimizing (slimming) the thicknesses of display devices, and research is increasingly conducted on a design with enhanced sense of beauty that can induce consumers to buy by appealing to the consumers' sense of beauty.

However, in design development for enhancing a scene of beauty or slimming of display devices that have been made to date, elements configuring a related art display device have been applied as is, and the structures of the elements have been changed. Due to these reasons, there are limitations in slimming display devices and developing the new designs of the display devices.

For example, in LCD devices of the related art, a lower case and a front case are necessarily used for receiving a liquid crystal display panel and a backlight unit, and moreover, a separate front set cover and rear set cover are additionally used for applying the LCD devices to notebook computers, monitors, mobile devices, televisions, etc.

As described above, display devices of the related art necessarily use the front set cover and rear set cover as well as the lower case and front case, and consequently, there are limitations in reducing the thicknesses of LCD devices or changing the designs thereof. Particularly, the front set cover and rear set cover necessarily cover a top edge of a liquid crystal display panel. Due to this reason, the thicknesses of display devices inevitably become thicker, and moreover, the border widths of the display devices enlarge. In addition, it is difficult to realize various innovative designs due to a step height in a border portion.

Recently, notebook computers with a built-in camera have been produced as products for video chatting or video conferences, and thus, an additional space for disposing the built-in camera is required in the notebook computers. Due to this reason, the border width of a screen in the notebook computers increases further, and moreover, due to the step height of a border portion, it is difficult to develop various innovative designs.

In order to solve such limitations, research is being made on various borderless type display devices where a step height is not formed on planes of the display devices or an upper case or front set cover exposed to the plane has a very narrow width.

Particularly, when a camera is mounted on a borderless type display device, a black matrix formed at a position corresponding to that of the camera is removed from among a plurality of black matrixes formed on an upper substrate of a display panel, and thereafter a transmitting hole is formed in a corresponding position. Accordingly, light outside the display device is incident into the camera independently from the black matrixes.

However, in the related art, since a vacuum space is formed between a lower substrate and a portion of an upper substrate with a though hole formed therein, when the upper substrate is pushed by an external pressure, the periphery of the transmitting hole is recessed, and consequently, mura is generated in an active area adjacent to the transmitting hole.

Moreover, in the related art, since a vacuum space is formed between a lower substrate and a portion of an upper substrate with a though hole formed therein, light that passes through the upper substrate of a glass material and the transmitting hole is diffracted and reflected by a camera lens, and thus, a concentric circle-shaped spectrum mura (diffraction pattern) is generated on an image that has been captured by the camera.

That is, in borderless type display devices with a built-in camera, since a transmitting hole for transmitting light to the camera is formed in a vacuum area between an upper substrate and a lower substrate, a portion of the upper substrate adjacent to a camera hole is recessed, and also, visible light is divided by bending of a glass substrate, an upper glass substrate, a lower glass substrate, the change of a refractive index in an internal vacuum state, and internal reflection. Due to this reason, a concentric circle-shaped spectrum mura (diffraction pattern) is generated near the transmitting hole and on an image that has been captured by the camera.

SUMMARY

Accordingly, the present invention is directed to provide a display device that substantially obviates one or more problems due to limitations and disadvantages of the related art.

An aspect of the present invention is directed to provide a display device which can maintain a space between a lower substrate and a portion of an upper substrate with a transmitting hole formed therein, in an atmospheric pressure state.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a display unit including a panel which is sealed, with liquid crystal being charged between an upper substrate and a lower substrate; and a guide frame supporting the display unit, wherein, the guide frame includes: a guide side wall guiding a side surface of the panel; and a panel supporting part supporting the panel, a camera receiving part receiving a camera is formed at a first panel supporting part of the panel supporting part, a transmitting hole which transmits light to the camera is formed at a black matrix in a first inactive area which is formed at the first panel supporting part, in the upper substrate, and in a space between the upper substrate and the lower substrate, a periphery of the transmitting hole is exposed in an atmospheric pressure state.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device according to embodiments of the present invention will be described in detail with reference to the accompanying drawings.

Figure 1:
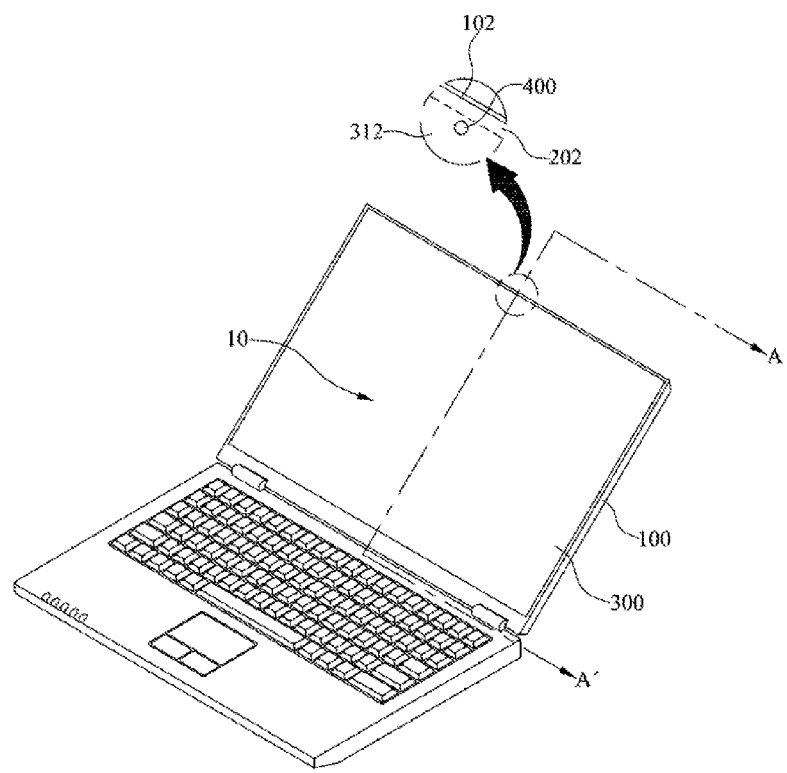
FIG. 1 is an exemplary view of a notebook computer to which a display device according to the present invention is applied.

FIG. 1 is an exemplary view of a notebook computer to which a display device according to the present invention is applied.

A display device 10 according to the present invention is mounted on small terminals such as notebook computers and used. Particularly, a camera 400 for collecting an image of a user using a small terminal is disposed under a panel of the display device 10.

Moreover, in the display device 10, a plane forming an outer appearance is formed without a step height, for implementing a borderless type display device.

The display device 10 for performing the above-described function, as illustrated in FIG. 1, may function as a monitor of a notebook computer that is a small terminal. The monitor is provided in a type where a set cover 100 surrounds the display device 10, and the set cover 100 and a plane of the display device 10 do not have a step height.

Figure 2:
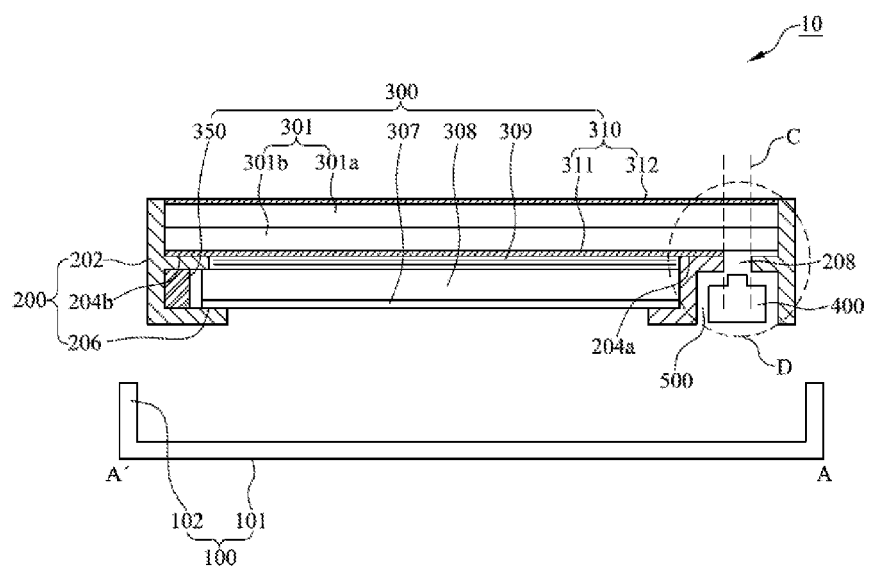
FIG. 2 is a sectional view for schematically describing a display device according to the present invention.

FIG. 2 is a sectional view for schematically describing a display device according to the present invention, and is a sectional view illustrating a sectional surface taken along line A-A' of FIG. 1.

The display device 10 configures the monitor that is mounted on the small terminal and displays an image. As illustrated in FIG. 2, the display device 10 includes a guide frame 200 and a display unit 300, and is mounted on and fixed to the set cover 100. Also, the camera 400 is disposed between the set cover 100 and guide frame 200, or between the guide frame 200 and a panel 301 of the display unit 300. That is, the display device 10 may configure the monitor of the small terminal, with the display device 10 being covered by the set cover 100. The display device 10 may include the set cover 100, but the embodiment is not limited thereto. Hereinafter, a display device of the present invention having no set cover will be described as an example. The set cover 100 covers the outer appearance of the display device 10, and substantially forms the outer appearance of a terminal as in a monitor of a notebook computer.

The set cover 100 is formed in a tetragonal frame shape, supports the guide frame 200, and surrounds a side surface of the guide frame 200, thereby covering the display device 10.

Herein, the set cover 100 may be formed of a plastic material or a metal material, and include a set plate 101 and a set side wall 102.

The set plate 101 acts as a bottom cover of the display device 10 that is produced in a flat type.

The set side wall 102 is bent vertically from the set plate 101 to form a receiving space. The set side wall 102 is formed to surround a side surface of the below-described guide frame 200 and acts as a side cover of the display device 10.

The guide frame 200 supports the display unit 300. The guide frame 200 is prepared at the set cover 100, and placed in the receiving space. The guide frame 200 includes a guide side wall 202, a panel supporting part 204, and a lower end supporting part 206. Particularly, a camera hole 208 is formed in a portion of the panel supporting part 204 with the camera 400 mounted thereon.

The guide side wall 202 is vertically formed in a tetragonal frame shape in parallel to the set side wall 102 of the set cover 100, and surrounds a side surface of the display unit 300. Herein, an upper surface of the guide side wall 202 surrounds the side surface of the display unit 300, in which case the upper surface of the guide side wall 202 is exposed to the outside not to overlap with an upper edge portion of the display unit 300 and thus forms a border of the display unit 300

The panel supporting part 204 protrudes from the guide side wall 202 in the direction opposite to the set side wall 102, and supports the display unit 300, particularly, the panel 301 thereof. That is, the panel supporting part 204 is formed at four corners of the guide side wall 202 having a tetragonal frame shape, and supports the panel 301.

The panel supporting part 204 may be again divided into a first panel supporting part 204a, a second panel supporting part 204b, a third panel supporting part (not shown), and a fourth panel supporting part (not shown).

Herein, as illustrated in FIG. 2, the first panel supporting part 204a denotes a portion of the panel supporting part 204 where the camera 400 is disposed. Also, the second panel supporting part 204b denotes a side surface opposite to the first panel supporting part 204a. The first and second panel supporting parts 204a and 204b are respectively formed at mutually opposing side walls of four side walls of the guide side wall 202 having a tetragonal frame shape. Also, the third and fourth panel supporting parts (not shown) are respectively formed at the other side walls of the four side walls of the guide side wall 202 having the tetragonal frame shape.

In the panel supporting part 204, the camera hole 208 is formed in the first panel supporting part 204a with the camera 400 disposed therein such that a lens of the camera 400 is exposed to the outside through the panel 301.

In FIG. 2, the camera 400 is illustrated as being disposed at a lower end of the first panel supporting part 204a, but the embodiment is not limited thereto. As another example, the camera 400 may be disposed between the first panel supporting part 204a and the panel 301, in which case the first panel supporting part 204a may be formed in a ∪-shape. That is, in FIG. 2, since the first panel supporting part 204a is formed in a ∩-shape, the camera 400 is disposed at a lower end of the first panel supporting part 204a, and the camera hole 208 is formed at the first panel supporting part 204a. However, when the first panel supporting part 204a is formed in a ∪-shape, the camera 400 is disposed between the first panel supporting part 204a and the panel 301, and a separate camera hole is not formed in the first panel supporting part 204a.

A camera receiving part 500 is a space that is formed on or under the first panel supporting part 204a in order for the camera 400 to be disposed therein. That is, as illustrated in FIG. 2, the camera receiving part 500 may be formed between the first panel supporting part 204a and the set plate 101, or between the first panel supporting part 204a and the panel 301.

The panel supporting part 204 may be formed in various shapes to protrude from the guide side wall 202, for supporting the panel 301 and receiving the camera 400.

The lower end supporting part 206 protrudes from a lower end of the panel supporting part 204 or a lower end of the guide side wall 202 in the direction opposite to the set side wall 102 and is formed under the panel supporting part 204. The lower end supporting part 206 supports a reflector 307, a light guide panel 308, an optical film part 309, and a light source 350.

The lower end supporting part 206 is formed under the panel supporting part 204 and supports the above-described elements. When the lower end supporting part 206 protrudes from the first panel supporting part 204a that receives the camera 400, as illustrated in FIG. 2, the lower end supporting part 206 protrudes from under a distal end of the first panel supporting part 204a in the direction opposite to the set side wall 102. However, when the lower end supporting part 206 does not protrude from the first panel supporting part 204a, the lower end supporting part 206 may protrude from the guide side wall 202 in the direction opposite to the set side wall 102, under the panel supporting part 204.

Moreover, although not shown, a space having a shape similar to that of the camera receiving part 500 may be further formed leftward and rightward from the first panel supporting part 204a with the camera 400 disposed therein. An antenna, an antenna wire or the like that is used in notebook computers may be disposed in the space.

The display unit 300 may include the panel 301, a plurality of polarizers 310 to 312, the optical film part 309, the light guide panel 308, the reflector 307, and the light source 350.

The panel 301 is formed by coupling the upper substrate 301a and the lower substrate 301b, and is divided into an active area with various elements formed therein and an inactive area formed outside the active area. Herein, the inactive area may be again divided into first to fourth inactive areas. The first inactive area is a portion disposed at the first panel supporting part 204a, the second inactive area is a portion disposed at the second panel supporting part 204b, the third inactive area is a portion disposed at the third panel supporting part, and the fourth inactive area is a portion disposed at the fourth panel supporting part.

By driving liquid crystal injected between the upper substrate 301a and the lower substrate 301b with a voltage applied to the lower substrate 301b, the panel 301 displays an image according to the transmittance of light emitted from the light source 350. The panel 301 may be formed in various types.

The light source 350 supplies light to the panel 301, and may use various kinds of light emitting elements. However, the light source 350 uses Light Emitting Diodes (LEDs) recently.

Figure 3:
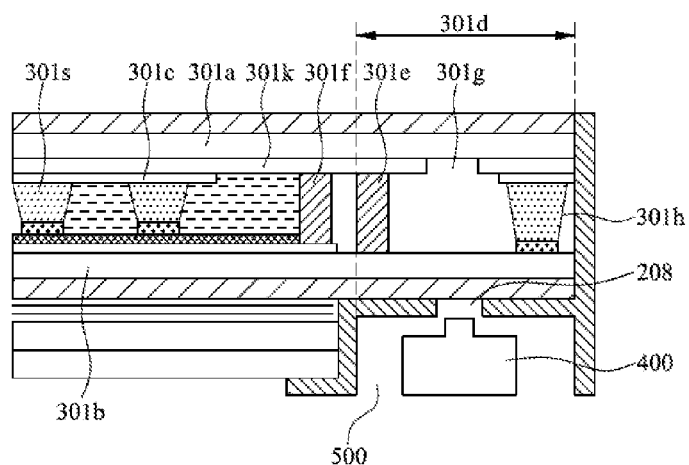
FIG. 3 is a detailed sectional view of a display device according to a first embodiment of the present invention.

The light guide panel 308 diffuses and reflects light emitted from the light source 350 to guide the light to the panel 301. The light guide panel 308, as illustrated in FIGS. 2 and 3, is included in a side type display device where the light source 350 is disposed at a side thereof, and reflects light, emitted from the light source 350, to the panel 301.

The optical film part 309 diffuses light transmitted through the light guide panel 308 or allows the light transmitted through the light guide panel 308 to be incident on a liquid crystal panel. The optical film part 309 may include a diffuser sheet, a prism sheet, etc. and be formed variously.

The reflector sheet 307 is disposed at a bottom of the light guide panel 308 and reflects light, emitted from the light source 350, to the panel 301. The light, which is emitted from the light source 350 and incident on the light guide panel 308, is refracted by a pattern formed at the light guide panel 308 and reflected to the panel 301. However, there may be some light that is not reflected by the light guide panel 308 and leaked to the outside through the bottom of the light guide panel 308. Therefore, the reflector sheet 307 again reflects the leaked light to guide the leaked light to the panel 301.

The polarizers (polarizing films) 310 to 312 are adhered to a plane or bottom of the panel 301 including the liquid crystal, and transmit only desired directional light according to the on/off of a voltage applied to the panel 301.

The present invention is characterized in the panel structure of the display unit 300. Hereinafter, therefore, a detailed configuration of the display device according to the present invention will be described with reference to FIGS. 3 to 9.

Figure 4:
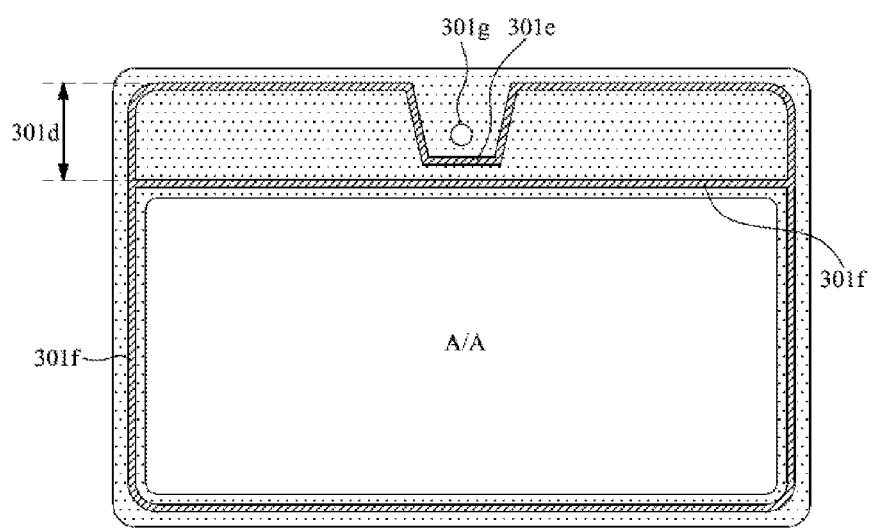
FIG. 4 is an exemplary view illustrating a plane of the display device of FIG. 3 according to the first embodiment of the present invention.

FIG. 3 is a detailed sectional view of a display device according to a first embodiment of the present invention, and illustrates a portion D of FIG. 2 in detail. FIG. 4 is an exemplary view illustrating a plane of the display device of FIG. 3 according to the first embodiment of the present invention, and illustrates an active area seal 301f formed at an edge of an active area A/A and a first inactive area seal 301e formed at the first inactive area.

That is, FIG. 3 is a detailed sectional view of the display device according to the first embodiment of the present invention, and is an exemplary view specifically illustrating a sectional surface of the panel 301.

The panel 301 includes the upper substrate 301a, the lower substrate 301b, and the liquid crystal layer formed between the upper substrate 301 and the lower substrate 301b.

The lower substrate 301b is a driving element array substrate. Although not specifically shown in the drawing, a plurality of pixels are formed at the lower substrate 301b, and a thin film transistor and a driving element are formed at each of the pixels.

The upper substrate 301a is a color filter substrate, and a color filter layer for realizing color is formed at the upper substrate 301a.

In the lower substrate 301b and upper substrate 301a, moreover, a plurality of pixel electrodes and common electrodes are formed and an alignment layer for aligning liquid crystal molecules of the liquid crystal layer is coated.

The lower substrate 301b and the upper substrate 301a are coupled by a sealant that is formed outside the lower substrate 301b and the upper substrate 301a, and a cell gap is maintained by a spacer that is formed between the lower substrate 301b and the upper substrate 301a.

In the panel 301 having the above-described configuration, an amount of light transmitted through the liquid crystal layer is controlled by driving the liquid crystal molecules with a plurality of driving elements formed at the lower substrate 301b, thereby displaying information.

In the panel 301, the lower substrate 301b is formed by a driving element array substrate process of forming the driving elements, and the upper substrate 301a is formed by a color filter substrate process of forming color filters.

The driving element array substrate process forms a plurality of gate lines and data lines that are arranged on the lower substrate 301b to define a plurality of pixel areas, forms a plurality of thin film transistors (driving elements) respectively connected to the gate lines and data lines, and then forms a plurality of pixel electrodes that are respectively connected to the thin film transistors and drive the liquid crystal layer according to respective signals applied through the thin film transistors.

The color filter substrate process forms a plurality of black matrixes 301k at the upper substrate 301a, forms a plurality of color filters 301c on the respective black matrixes 301k, and then forms a plurality of common electrodes (not shown). Such a process is performed in a Twisted Nematic (TN) mode. In an In plane switching (IPS) mode, the common electrodes are formed at the lower substrate 301b. That is, the present invention may be applied to the TN mode and the IPS mode.

As illustrated in FIG. 3, the black matrixes 301k are coated on the upper substrate 301a of the panel 301 applied to the display device according to the first embodiment of the present invention. Some of the black matrixes 301k are formed even in the first inactive area 301d of the panel 301. A transmitting hole 301g is formed in the black matrix 301k formed in the first inactive area 301d, at a position corresponding to the camera 400. The transmitting hole may be formed by an etching process of the color filter substrate process. That is, the black matrix 301k, color filter 301c, and common electrode (not shown) are deposited on the upper substrate 301a, and then the transmitting hole 301g is formed by the etching process with a mask. In this case, the transmitting hole 301g is formed by simultaneously etching the black matrix 301k and the color filter 301c or the common electrode.

Moreover, a spacer for maintaining a constant cell gap between the upper substrate 301a and the lower substrate 301b is formed at a common electrode or planarization layer of the upper substrate 301a. A column space 301s may be applied as the spacer. The column spacer 301s may be formed at a desired position at the same density, in the entire panel 301. That is, as the column spacer 301s is formed at a desired position, the constant cell gap between the upper substrate 301a and the lower substrate 301b is maintained, thus preventing the decrease in an aperture ratio. The column spacer 301s may be formed of a resin-based transparent material. Also, since it is difficult to accurately match the column spacer 301s with the cell gap, as illustrated in FIG. 3, a material such as a pigment or a metal may be added to a lower end of the column spacer 301s. Herein, the pigment or metal is formed at the lower substrate 301b, the column spacer 301s is formed at the upper substrate 301a, and then the two materials are combined by coupling of the upper substrate 301a and lower substrate 301b, thereby maintaining the cell gap. A protrusion (which is formed of a pigment or a metal) corresponding to the column spacer 301s may be formed at the lower substrate 301b, and prevents the column spacer 301s from being pressed when the column spacer 301s contacts the lower substrate 301b. Therefore, the column spacer 301a maintains the cell gap between the upper substrate 301a and the lower substrate 301b, and may denote only the column spacer itself. However, the column spacer 301a may include the pigment or the metal.

As described above, the column spacer 301s deposited on the upper substrate 301a may directly contact the lower substrate 301b and maintain the cell gap between the upper substrate 301a and the lower substrate 301b. Alternatively, the column spacer 301s may contact the protrusion and maintain the cell gap.

That is, the panel 301 is formed by coupling of the lower substrate 301b and the upper substrate 301a with the column spacer 301s formed therein.

In a final process, an edge of the active area A/A of the panel 301 is sealed by the active area seal 301f, the liquid crystal is injected into the liquid crystal layer through a seal injection port when the edge of the active area A/A has been sealed, and then the seal injection port is finally sealed, thereby completing the formation of the panel 301.

A liquid crystal injecting process and a seal forming process for the active area seal 301f are performed in a vacuum state.

The first inactive area 301d of the inactive area of the panel 301 and an edge of the first inactive area 301d are sealed by the first inactive area seal 301e, and thus the cell gap between the upper substrate 301a and the lower substrate 301b can be maintained.

However, as illustrated in FIG. 4, the first inactive area seal 301e is formed not to cover the transmitting hole 301g. That is, the first inactive area seal 301e is formed to surround an edge of the transmitting hole 301g, and a process of forming the first inactive area seal 301e is also performed in a vacuum state.

Therefore, the active area A/A surrounded by the active area seal 301f and a portion of the first inactive area surrounded by the first inactive area seal 301e are maintained in a vacuum state, but the periphery of the transmitting hole 301g (which is not surrounded by the first inactive area seal 301e) in the first inactive area 301d is maintained in an atmospheric pressure state. The periphery of the transmitting hole 301g denotes an upper and lower space between the upper substrate 301a with the transmitting hole 301g formed therein and the lower substrate 301b adjacent to the camera hole 208 or a camera lens, and denotes an ambient space which includes a cylindrical space having a diameter greater than or equal to that of the transmitting hole 301g.

That is, by maintaining the periphery of the transmitting hole 301g in the first inactive area 301d in an atmospheric pressure state, the present invention prevents bending of a substrate that is disposed near the transmitting hole 301g or the camera hole 208, thus decreasing spectrum mura near the transmitting hole 301g or the camera hole 208.

To provide an additional description, in the first embodiment of the present invention, since a space between the transmitting hole 301g and the camera hole 208 is maintained in an atmospheric pressure state, the upper substrate 301a and the lower substrate 301b are not pressured therebetween, and thus, the upper substrate 301a and lower substrate 301b are not bent. Accordingly, spectrum mura are not generated near the transmitting hole 301g or camera hole 208.

Although not shown in FIG. 4, as illustrated in FIG. 3, a first inactive area column spacer 301h may be formed even near the transmitting hole 301g that is in an atmospheric pressure state, for maintaining a cell gap between the upper substrate 301a and the lower substrate 301b.

Figure 5:
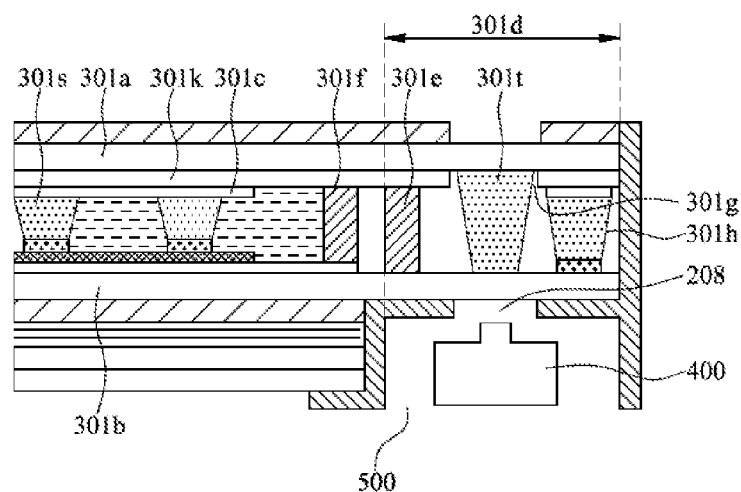
FIG. 5 is a detailed sectional view of a display device according to a second embodiment of the present invention.
Figure 6:
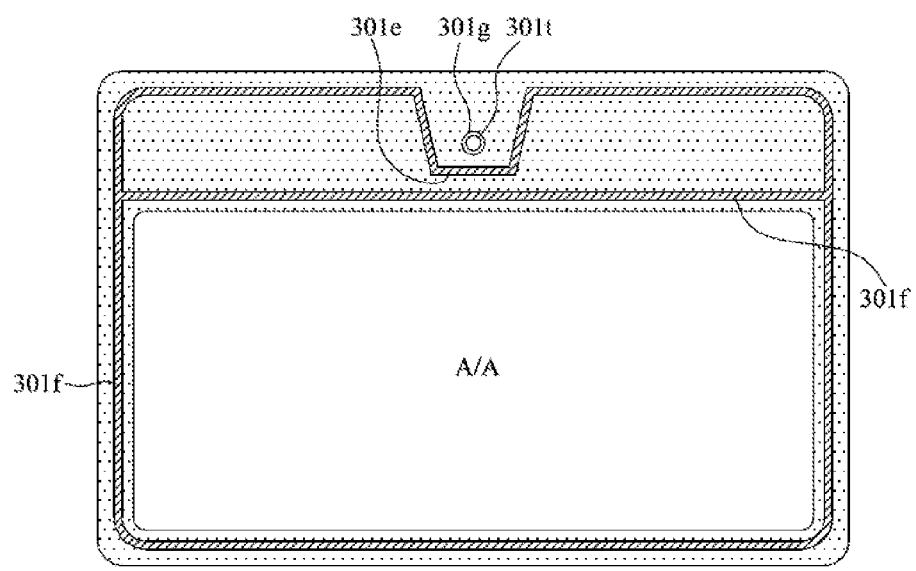
FIG. 6 is an exemplary view illustrating a plane of the display device of FIG. 5 according to the second embodiment of the present invention.

FIG. 5 is a detailed sectional view of a display device according to a second embodiment of the present invention, and illustrates the portion D of FIG. 2 in detail. FIG. 6 is an exemplary view illustrating a plane of the display device of FIG. 5 according to the second embodiment of the present invention, and illustrates an active area seal 301f formed at an edge of an active area A/A and a first inactive area seal 301e formed at a first inactive area.

Except that a transparent material is added between a camera hole 208 and a transmitting hole 301g in the first inactive area, the display device of the second embodiment has the same structure as that of the first embodiment, and thus, a description that is repetitive of the first embodiment is not provided or will be briefly described below.

A panel 301 includes an upper substrate 301a, a lower substrate 301b, and a liquid crystal layer formed between the upper substrate 301a and the lower substrate 301b.

A configuration and manufacturing method of the lower substrate 301b are the same as those of the lower substrate of the first embodiment.

A configuration and manufacturing method of the upper substrate 301a are also the same as those of the upper substrate of the first embodiment.

Moreover, the first inactive area seal 301e, which surrounds a portion of the first inactive area other than the periphery of the transmitting hole 301g and active area seal 301f formed at an edge of the active area A/A, has the same shape as that of the first embodiment.

The display device according to the second embodiment of the present invention is characterized in that a solid transmitting material 301t is formed in a space between the camera hole 208 and the transmitting hole 301g that is maintained in an atmospheric pressure state, in a space between the upper substrate 301a and the lower substrate 301b.

A plurality of column spacers 301s and 301h are formed in the active area or the first inactive area, and then the transmitting material 301t may be formed. Alternatively, the transmitting material 301t may be formed simultaneously with the column spacers 301s and 301h.

Herein, the transmitting material 301t may be formed of a material having a refractive index similar to that of a glass which forms the upper substrate 301a and the lower substrate 301b, and remove a spectrum type of concentric circle by reducing the diffraction of light transmitted through the transmitting hole 301g.

However, only a glass is not used as the transmitting material 301t. For example, a transmitting material, having a refractive index similar to that of a glass which forms the upper substrate 301a and the lower substrate 301b, may be used as the transmitting material 301t. Therefore, the transmitting material 301t may be formed of a resin-based transparent material that forms the column spacer 301s, in which case the transmitting material 301t may be formed together with the column spacer 301s.

The transmitting material 301t may be formed by a deposition process. However, a transmitting material, which corresponds to the transmitting hole 301g in shape and has been manufactured by a separate process in consideration of a gap between the upper substrate 301a and the lower substrate 301b, may be disposed in the transmitting hole 301g. That is, since the periphery of the transmitting hole 301g is exposed to the outside in an atmospheric pressure state, the transmitting material manufactured by the separate process may be disposed between the transmitting hole 301g and the camera hole 208 and then fixed with a separate adhesive.

In the second embodiment of the present invention, a transmitting material having a refractive index similar to that of a glass minimizes the refraction of light transmitted through the transmitting hole 301g, and thus, the diffraction of light is minimized. Accordingly, spectrum mura shown on a surface of the panel 301 can be reduced, and thus, visibility can be improved and a concentric-circle diffraction pattern can be removed from a captured image.

The refractive index of the transmitting material 301t may have a value from about 1.3 to about 1.7 when considering diffraction characteristic.

The transmitting material 301t is a material forming the column spacer, and may be manufactured by a method similar to that of the column spacer.

Figure 7:
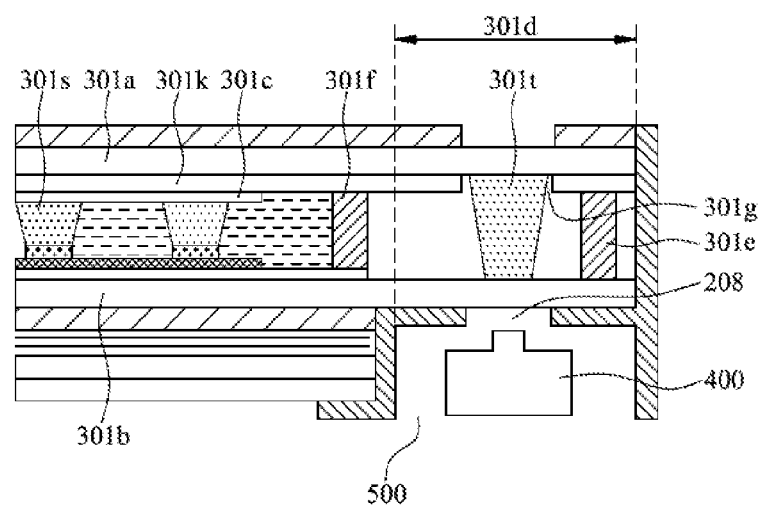
FIG. 7 is a detailed sectional view of a display device according to a third embodiment of the present invention.
Figure 8:
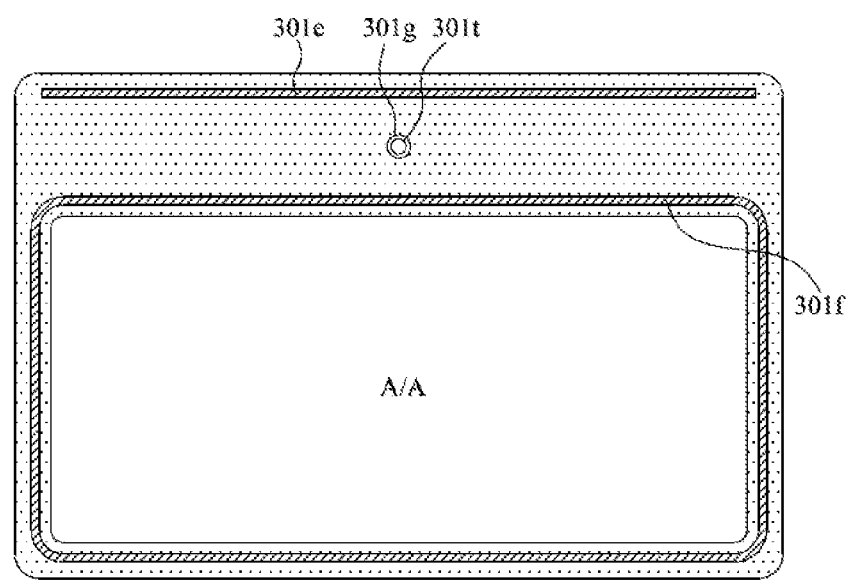
FIG. 8 is an exemplary view illustrating a plane of the display device of FIG. 7 according to the third embodiment of the present invention.

FIG. 7 is a detailed sectional view of a display device according to a third embodiment of the present invention, and illustrates the portion D of FIG. 2 in detail. FIG. 8 is an exemplary view illustrating a plane of the display device of FIG. 7 according to the third embodiment of the present invention, and illustrates an active area seal 301f formed at an edge of an active area A/A and a first inactive area seal 301e formed at a first inactive area.

Except the shape of the first inactive area seal 301e formed in the first inactive area, the display device of the third embodiment has the same structure as that of the second embodiment, and thus, a description that is repetitive of the first embodiment or second embodiment is not provided or will be briefly described below.

The display device of the second embodiment of FIG. 2 is characterized in that the transmitting material 301t is formed between the transmitting hole and the camera hole, and likewise, the display device of the third embodiment has a transmitting material that is formed between a transmitting hole and a camera hole. However, unlike the display device of the second embodiment where the first inactive area seal 301e surrounds the exterior of the first inactive area other than the periphery of the transmitting hole, as illustrated in FIG. 8, the display device of the third embodiment is characterized in that the first inactive area seal 301e is formed only at a side surface which is on the reverse of an active area A/A with a transmitting hole 301g as a boundary therebetween in the first inactive area.

A panel 301 includes an upper substrate 301a, a lower substrate 301b, and a liquid crystal layer formed between the upper substrate 301a and the lower substrate 301b.

A configuration and manufacturing method of the lower substrate 301b are the same as those of the lower substrate of the first embodiment or second embodiment.

A configuration and manufacturing method of the upper substrate 301a are also the same as those of the upper substrate of the first embodiment or second embodiment.

Moreover, the active area seal 301f formed at an edge of the active area A/A is the same as that of the first embodiment or second embodiment.

Furthermore, the third embodiment is the same as the second embodiment in that a solid transmitting material 301t is formed in a space between the camera hole 208 and the transmitting hole 301g that is maintained in an atmospheric pressure state, in a space between the upper substrate 301a and the lower substrate 301b.

In the second embodiment and the third embodiment, the transmitting material 301t having a refractive index similar to that of a glass minimizes the refraction of light transmitted through the transmitting hole 301g, and thus, the diffraction of light is minimized Accordingly, spectrum mura shown on a surface of the panel 301 can be reduced, and thus, visibility can be improved and a concentric-circle diffraction pattern can be removed from a captured image.

The display device of the third embodiment is characterized in that the first inactive area seal 301e is formed to surround only a portion of the first inactive area.

In the first embodiment and the second embodiment, a sealed space is formed to surround a portion of the first inactive area other than the periphery of the transmitting hole when the first inactive area seal 301e is being connected to a portion of the active area seal 301f. In the third embodiment, however, the first inactive area seal 301e is separately formed to be completely separated from the active area seal 301f.

To provide an additional description, in the first embodiment and the second embodiment, a portion of the first inactive area 301d other than the transmitting hole 301g is surrounded by the first inactive area seal 301e and the active area 301f to maintain a vacuum state, and only the periphery of the transmitting hole is exposed in an atmospheric pressure state. However, in the third embodiment, as illustrated in FIG. 8, the first inactive area seal 301e is formed only at a side surface that is on the reverse of the active area A/A with the transmitting hole 301g as a boundary therebetween, and thus, the entirety of the first inactive area 301d is exposed in the atmospheric pressure state.

In the display device of the third embodiment, since the entire first inactive area 301d including the transmitting hole is exposed in the atmospheric pressure state, it is possible for the upper substrate 301a and lower substrate 301b to be recessed in a direction facing each other, and moreover, since the transmitting material 301t having a refractive index similar to that of a glass forming the upper substrate 301a and lower substrate 301b is formed between the transmitting hole and the camera hole, the generation of spectrum mura can be prevented around the transmitting hole. Accordingly, concentric-circle spectrum mura is not generated on a captured image.

In FIGS. 7 and 8, the display device of the third embodiment is illustrated as including the transmitting material 301t, but the third embodiment is not limited thereto. For example, in the display device of the third embodiment, as illustrated in FIGS. 7 and 8, the first inactive area seal 301e may be formed even without the transmitting material 30 it.

That is, the first inactive area seal 301e of the first embodiment of FIGS. 3 and 4 may be formed as illustrated in FIG. 8.

Figure 9:
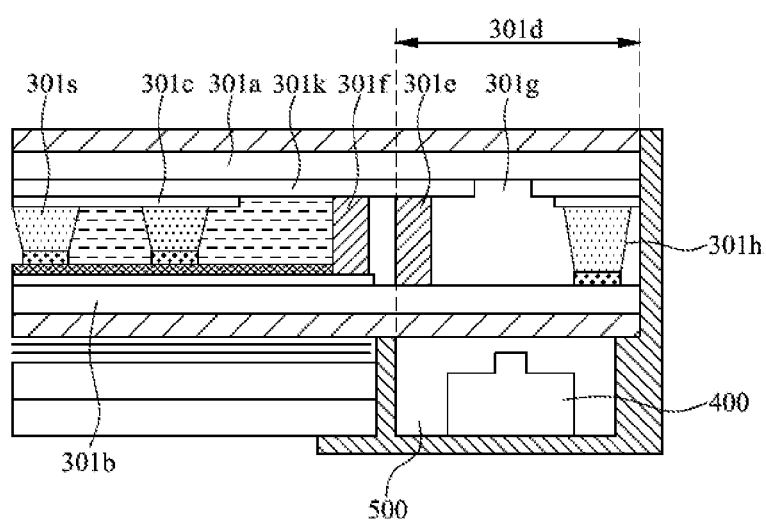
FIG. 9 is another detailed sectional view of a display device according to the present invention.

FIG. 9 is another detailed sectional view of a display device according to the present invention. Comparing with the display device of the first embodiment that has been described above with reference to FIG. 3, only the structure of the first panel supporting part 204a differs from that of the display device of FIG. 9, and the other elements are the same. Hereinafter, therefore, a repetitive description is not provided or will be briefly described.

Comparing with the first embodiment of FIG. 3, the display device of FIG. 9 has the same structure and function as those of the first embodiment, except that the structure of the first panel supporting part 204a with the camera receiving part 500 formed therein differs from that of the display device of FIG. 9.

As described above with reference to FIG. 2, the first panel supporting part 204a may be formed in a ∩-shape or a ∪-shape. FIGS. 2, 3, 5 and 7 illustrate the first panel supporting part 204a formed in the ∩-shape, but FIG. 9 illustrates a first panel supporting part formed in the ∪-shape.

Except for the first panel supporting part, the display device of FIG. 9 is the same as the display device of the first embodiment of FIG. 3 in structure.

Although not shown, the first panel supporting part of the second embodiment of FIGS. 5 and 6 may be formed in the same shape as that of the first panel supporting part of FIG. 9. Also, the first panel supporting part of the third embodiment of FIGS. 7 and 8 may be formed in the same shape as that of the first panel supporting part of FIG. 9.

In the borderless type display device, when a camera is disposed under a lower substrate, the present invention decreases spectrum mura that is generated around the transmitting hole 301g or camera hole 208.

In the borderless type display device of the related art, a transmitting hole is formed by removing some of black matrixes, and a camera is disposed under a lower substrate. In this case, since the transmitting hole is disposed in a vacuum area, bending between an upper substrate and a lower substrate is made, a refractive index is changed in an internal vacuum state between the upper substrate and the lower substrate, and visible light is divided by internal reflection. Due to these reasons, spectrum mura similar to a camera lens flare appears on a surface of a panel and an image captured by a camera.

Accordingly, by maintaining the periphery of the transmitting hole in the atmospheric pressure state, the present invention removes spectrum mura due to bending of the glass substrate, and moreover, by disposing the transmitting material between the transmitting hole and the camera hole, the present invention removes spectrum mura due to the change of the refractive index.

As described above, the space between the lower substrate and the portion of the upper substrate with the transmitting hole formed therein is maintained in an atmospheric pressure state, and therefore, the periphery of the transmitting hole is not recessed and thus spectrum mura (diffraction pattern) is prevented, thereby improving an image captured by the camera.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A display device comprising:
a display unit comprising a panel which is sealed, with liquid crystal being charged between an upper substrate and a lower substrate; and
a guide frame supporting the display unit,
wherein,
the guide frame comprises: a guide side wall guiding a side surface of the panel; and a panel supporting part supporting the panel,
a camera receiving part receiving a camera is formed at a first panel supporting part of the panel supporting part,
a transmitting hole which transmits light to the camera is formed at a black matrix in a first inactive area which is formed at the first panel supporting part, in the upper substrate,
in a space between the upper substrate and the lower substrate, a periphery of the transmitting hole is exposed in an atmospheric pressure state, and
a first inactive area seal is formed at a portion of the first inactive area other than the periphery of the transmitting hole, the first inactive area seal sealing the space between the upper substrate and the lower substrate.

2. The display device of claim 1, wherein the transmitting hole is formed by etching the black matrix.

3. The display device of claim 1, wherein a camera hole corresponding to the transmitting hole is formed in the first panel supporting part.

4. The display device of claim 1, wherein in the space between the upper substrate and the lower substrate, a transmitting material having a refractive index from about 1.3 to about 1.7 is formed at a portion of the space with the transmitting hole formed therein.

5. The display device of claim 4, wherein the transmitting material is formed in a column spacer type.

6. The display device of claim 1, wherein in the first inactive area, a first inactive area column spacer is formed around the transmitting hole.

7. The display device of claim 1, wherein,
an active area seal is formed at an active area exterior of the panel,
the first inactive area seal is formed in the first inactive area,
the first inactive area seal is connected to the active area seal,
a portion of the first inactive area other than the periphery of the transmitting hole is maintained in a sealed state, and
the periphery of the transmitting hole is exposed in an atmospheric pressure state.

8. The display device of claim 7, wherein in the space between the upper substrate and the lower substrate, a transmitting material having a refractive index from about 1.3 to about 1.7 is formed at a portion of the space with the transmitting hole formed therein.

9. The display device of claim 1, wherein the first panel supporting part is formed in a ∪-shape.

10. The display device of claim 1, wherein,
the first panel supporting part is formed in a ∩-shape, and
a camera hole corresponding to the transmitting hole is formed at the first panel supporting part.

11. A display device comprising:
a display unit comprising a panel which is sealed, with liquid crystal being charged between an upper substrate and a lower substrate; and
a guide frame supporting the display unit,
wherein,
the guide frame comprises: a guide side wall guiding a side surface of the panel; and a panel supporting part supporting the panel,
a camera receiving part receiving a camera is formed at a first panel supporting part of the panel supporting part,
a transmitting hole which transmits light to the camera is formed at a black matrix in a first inactive area which is formed at the first panel supporting part, in the upper substrate,
in a space between the upper substrate and the lower substrate, a periphery of the transmitting hole is exposed in an atmospheric pressure state,
an active area seal is formed at an active area exterior of the panel,
a first inactive area seal is formed in the first inactive area, and
the first inactive area seal is formed on the reverse of the active area with the transmitting hole as a boundary, thereby exposing the entire first inactive area in an atmospheric pressure state.

12. The display device of claim 11, wherein in the space between the upper substrate and the lower substrate, a transmitting material having a refractive index from about 1.3 to about 1.7 is formed at a portion of the space with the transmitting hole formed therein.

* * * * *